UNITED STATES PATENT OFFICE.

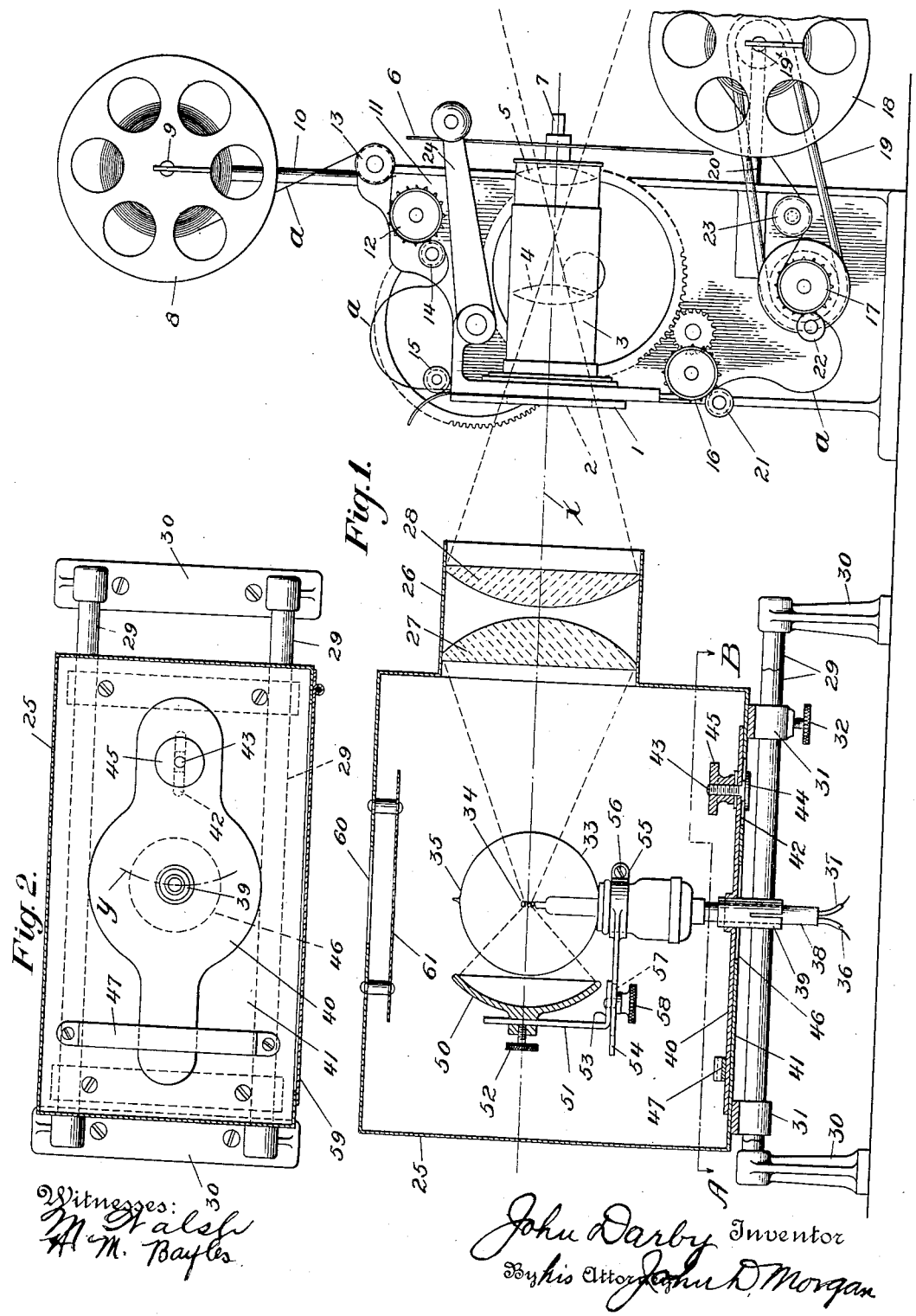

JOHN DARBY, OF SUMMIT, NEW JERSEY, ASSIGNOR TO FRANCIS B. GRIFFIN AND EDWARD C. WALLACE, BOTH OF NEW YORK, N. Y.

LIGHT-PROJECTOR FOR MOTION-PICTURE MACHINES.

1,174,479.  Specification of Letters Patent.  Patented Mar. 7, 1916.

Application filed January 26, 1914, Serial No. 814,428. Renewed August 19, 1915. Serial No. 46,350.

*To all whom it may concern:*

Be it known that I, JOHN DARBY, a citizen of the United States, residing at Summit, in the county of Union and State of New Jersey, have invented certain new and useful Improvements in Light-Projectors for Motion-Picture Machines, of which the following is a specification.

The invention relates to moving picture projecting apparatus, and more especially to lamps or illuminating devices in conjunction with the projecting devices.

Objects and advantages of the invention will be set forth in part hereinafter and in part will be obvious herefrom, such objects and advantages being attained by the means and instrumentalities pointed out and indicated in the accompanying claims.

The invention consists in the novel parts, constructions, arrangements, combinations, and improvements herein shown and described.

Of the drawings: Figure 1 is a side elevation showing the lamp or illuminating construction in longitudinal vertical section and showing the projecting mechanism in elevation; and Fig. 2 is a section on the line A—B, of Fig. 1 as showing the complete device.

Suitable means are provided for coöperating with the lamp or illuminating means to project the picture in magnified form onto the screen, and in the embodied form of such means a plate 1 is provided having an aperture, in which aperture the successive pictures on the film *a* are successively framed for a brief instant in the well-known manner, the film *a* being intermittently fed past said aperture the distance of a single picture at a time. In front of the apertured plate 1 is a lens tube or lens carrier 3 supplied with suitable projecting lenses in proper number and properly located, and shown herein as two lenses 4 and 5.

In front of the lens carrier 3 moves a shutter 6 adapted to pass the light when a picture is stationary in the aperture 2, and obscuring the light during the moving of the film in front of the aperture 2. Said shutter may be of any approved construction and may operate in the usual manner, and is shown herein, carried upon a shaft 7 rotating in proper time relation with the film traveling mechanism.

The film traveling mechanism, so far as regards many features of the invention may be of any approved and desired form, and as shown herein the supply is carried upon a reel 8 rotating upon a shaft 9 formed upon a rod 10, which rod extends upwardly from the frame 11 of the machine. Said film strip *a* is drawn continuously from the reel 8 by suitable devices such as a sprocket roller 12, which engages with series of holes in the edges of the film in the well-known manner. Suitable friction and guiding rollers, such as 13, 14 and 15 assist in guiding the film strip into the guide-way past the apertured plate.

Suitable means for giving the intermittent feed to the film strip past the apertured plate are provided, such as an intermittently moving sprocket roller 16, driven in a suitable manner (not shown in detail). Suitable tension devices are also provided for regulating the travel of the film.

Means for uniformly winding the film are likewise provided of any suitable form, and as shown include a uniformly traveling sprocket roller 17 and a reel 18 driven by belt 19, arranged to slip to compensate for varying size of the roll of film upon the reel. The reel 18 is supported on a shaft 18' carried by a bracket 20 extending from the frame 11. Suitable friction or guiding rolls such as 21, 22 and 23 are also provided. The mechanism may be driven in a suitable manner as by a crank 24 and gearing and connections therefrom are provided which need not be described in detail.

Referring now to the illuminating devices, said devices are inclosed in a casing 25, said casing carrying a tube 26 in which are mounted the condensing lenses 27 and 28. The casing 25 is adjustable to and from the projecting mechanism, and the embodied form of such moving or adjusting means comprises rods 29 mounted upon supports 30. Embracing the rods 29 are lugs 31 fixed to the casing 25, the casing 25 thus being slidable along the rods 29. A clamping screw 32 may be used to hold the casing 25 in the desired position.

Within the casing 25 is a lamp 33, represented as an electric lamp having a film or other light producing means 34, with an inclosing globe of glass 35. Said lamp is adjustable in various ways with respect to its mounting and with respect to the axis of the projecting lenses, and of the condensing lenses, which axis is diagrammatically indicated by the broken line $x$.

In the embodied form of adjusting means for the lamp 33, the circuit wires 36 and 37 pass outwardly through a tube 38. The tube 38 makes a friction fit in the slotted sleeve 39 of spring metal, which sleeve thus permits of the tube 38 being slid upwardly and downwardly therein, the friction fit holding it firmly in the position to which it is so adjusted. The lamp is thus vertically adjustable relatively to the axis $x$ of the lenses. Means are likewise provided for longitudinally adjusting the lamp relatively to the axis $x$ and to the focal point of the condensing lenses. As embodied, said means comprise the plate 40 slidable along the bottom 41 of the casing 25. Below said plate in bottom 41 is a slot 42 passing also through a hole in the plate, and through said slot projects a threaded pin 43, said pin having underneath a head 44 larger than the slot. Threaded upon the pin 43 is a nut 45. The plate 40 is thus slidable longitudinally along the bottom 41 of the casing 25, and may be clamped firmly in a desired adjusted position by the nut 45.

The spring sleeve 39 is fixed to and carried by the plate 40, the bottom 41 of the casing being cut away as shown at 46 to allow of the sleeve 39 moving with the plate 40.

The lamp is also transversely adjustable relatively to the lens axis $x$, and in accordance with one feature of the invention such transverse adjustment is also radial, and in practice the plate 40 swings or pivots about the pin 43, the radial line along which the lamp moves, being indicated diagrammatically by $y$ in Fig. 2. Thus the lamp is kept substantially in the same focal distance with the condensing lenses. The plate 40 works under a guide 47, which prevents the rear end from rising and causes it to rest firmly upon the bottom 41 of the casing while being readily adjustable or movable relatively thereto.

Means are also provided for reflecting the light and for regulating or adjusting the reflector relatively to the lamp and the lenses. As embodied, a concave spherical reflector 50 is carried upon the lamp structure and is therefore movable or adjustable with respect to the lamp. The reflector is also adjustable to and from the lamp substantially along the line of the axis $x$ of the lenses. It is also adjustable vertically, and likewise transversely, and if desired radially with respect to the light. As embodied, the reflector 50 is slidably mounted upon a vertical support 51, a clamping screw 52 serving to hold it in the desired position. The support 51 is bent into a foot 53 substantially at right angles to the vertical supporting part thereof. Said foot 53 rests upon and is movable with respect to the horizontally extending plate 54, which plate is provided with a ring or collar 55 embracing the lamp socket and fastened thereto by clamping screw 56. The plate 54 has a slot 57 therein through which passes a clamping screw 58 for firmly clamping together the foot 53 and the plate 54 in the desired position to which they may be adjusted.

The casing 25 may be conveniently provided with a door 59 and may have a ventilated opening 60 with a light shield 61 adjacent thereto.

It will be understood from the foregoing that devices have been provided realizing the objects and advantages herein pointed out, together with other objects and advantages.

It will be understood further that changes may be made from the precise form of such devices herein shown and described, within the scope of the accompanying claims, without departing from the principles of the invention and without sacrificing its chief objects and advantages.

I claim—

1. In a moving picture projecting machine and in combination, a condensing lens, a lamp, a lamp support, means for adjusting said lamp longitudinally with reference to the axis of the condensing lens, means for laterally and radially adjusting said lamp relatively to said condensing lens, means for adjusting said lamp vertically relatively to the axis of said condensing lens, a spherical reflector, means for adjusting said reflector vertically with respect to said lamp, and means for adjusting said reflector longitudinally of its axis with respect to said lamp, said adjusting means being carried by said lamp support.

2. In a moving picture machine and in combination, a condensing lens, a lamp, a pivotally adjustable support on which said lamp is carried and with which the lamp moves, said support being adjustable with its pivot longitudinally of the axis of said condensing lens, and also transversely and radially adjustable relatively to the condensing lens about its pivot.

3. In a moving picture projecting machine and in combination, a casing having a slot formed therein and having a condensing lens mounted therein, a lamp, a pivot in said slot, a carrier for said lamp mounted upon said pivot within said casing, said carrier and said lamp being adjustable together longitudinally along said slot, and laterally about said pivot with respect to the axis of said condensing lens.

4. In a moving picture projecting machine and in combination a lamp casing, a condensing lens carried by said casing, a lamp carrier slidably mounted on said casing, and having a lamp supporting portion pivotally supported upon said slidable carrier to swing horizontally and to slide longitudinally, a lamp supported by and vertically adjustable relatively to said support, and a concave reflector supported by said pivoted lamp supporting portion.

In testimony whereof, I have signed my name to this specification, in the presence of two subscribing witnesses.

JOHN DARBY.

Witnesses:
JOHN D. MORGAN,
MARGARET WALSH.